(12) United States Patent
Graaf et al.

(10) Patent No.: US 9,242,528 B2
(45) Date of Patent: Jan. 26, 2016

(54) HEAT EXCHANGER ARRANGEMENT AND AIR CONDITIONING SYSTEM OF A MOTOR VEHICLE

(71) Applicant: VISTEON GLOBAL TECHNOLOGIES, INC., Van Buren Township, MI (US)

(72) Inventors: Marc Graaf, Krefeld (DE); Roberto Della Rovere, Kerpen (DE); Navid Durrani, Kerpen (DE)

(73) Assignee: Hanon Systems, Daejeon-si (KR)

( * ) Notice: Subject to any disclaimer, the term of this patent is extended or adjusted under 35 U.S.C. 154(b) by 147 days.

(21) Appl. No.: 14/032,976

(22) Filed: Sep. 20, 2013

(65) Prior Publication Data

US 2014/0075973 A1    Mar. 20, 2014

(30) Foreign Application Priority Data

Sep. 20, 2012  (DE) .......................... 10 2012 108 886

(51) Int. Cl.
*B60H 1/00* (2006.01)
(52) U.S. Cl.
CPC ........ *B60H 1/00328* (2013.01); *B60H 1/00028* (2013.01); *B60H 1/00057* (2013.01); *B60H 1/00064* (2013.01); *B60H 2001/00085* (2013.01); *B60H 2001/00135* (2013.01); *B60H 2001/00178* (2013.01)
(58) Field of Classification Search
CPC .......... B60H 1/00328; B60H 1/00028; B60H 1/00057; B60H 1/00064; B60H 2001/00178; B60H 2001/00085; B60H 2001/00135

USPC .......... 62/115, 90, 160, 173, 176.5, 229, 404; 165/104.21
See application file for complete search history.

(56) References Cited

U.S. PATENT DOCUMENTS

| 6,430,951 B1* | 8/2002 | Iritani et al. .................... 62/229 |
| 6,862,892 B1 | 3/2005 | Meyer et al. |
| 7,152,422 B2 | 12/2006 | Takano et al. |
| 7,536,869 B2 | 5/2009 | Inaba et al. |
| 7,637,031 B2 | 12/2009 | Salim et al. |
| 2003/0205370 A1* | 11/2003 | Kim ............................ 165/204 |

(Continued)

FOREIGN PATENT DOCUMENTS

| DE | 69721268 T2 | 1/2004 |
| DE | 102004003787 A1 | 8/2005 |

(Continued)

*Primary Examiner* — Mohammad M Ali
(74) *Attorney, Agent, or Firm* — Fraser Slemens Martin & Miller LLC; James D. Miller

(57) ABSTRACT

The invention relates to a heat exchanger arrangement for heating of air, with a heat exchanger (8) which is integrated into a refrigerant circuit (60), configured to be able to have refrigerant flow through it and able to be impinged on by air. The heat is transferred from the refrigerant to the air. The heat exchanger (8) exhibits two components (8a, 8b) configured to be segregated from each other. The first component (8a) is configured with a condensation surface and a heat-removal surface. The second component (8b) exhibits a supercooling surface. Between the components (8a, 8b) on the refrigerant side, a refrigerant phase separation element is placed. The heat exchanger is configured as a tubular heat exchanger with tubes situated in rows, wherein the first component (8a) is configured with at least two rows and the second component (8b) with at least one row.

14 Claims, 2 Drawing Sheets

(56) References Cited

U.S. PATENT DOCUMENTS

| | | | |
|---|---|---|---|
| 2004/0074246 A1* | 4/2004 | Kurata et al. | 62/196.4 |
| 2004/0216483 A1* | 11/2004 | Inaba et al. | 62/498 |
| 2005/0115704 A1* | 6/2005 | Ito et al. | 165/202 |
| 2006/0005557 A1* | 1/2006 | Takano et al. | 62/238.6 |
| 2006/0059925 A1* | 3/2006 | Horan et al. | 62/129 |
| 2006/0237164 A1 | 10/2006 | Bouchalat et al. | |
| 2006/0277931 A1* | 12/2006 | Nakamura et al. | 62/196.1 |
| 2007/0017240 A1* | 1/2007 | Shapiro | 62/228.1 |
| 2008/0210406 A1* | 9/2008 | Rini et al. | 165/104.19 |
| 2008/0319587 A1* | 12/2008 | Cowans et al. | 700/299 |
| 2009/0000146 A1 | 1/2009 | Salim et al. | |
| 2009/0193830 A1 | 8/2009 | Yoshioka | |
| 2009/0205350 A1 | 8/2009 | Takahashi et al. | |
| 2009/0205353 A1 | 8/2009 | Takahashi | |
| 2009/0241570 A1 | 10/2009 | Kuribayashi et al. | |
| 2011/0005255 A1 | 1/2011 | Tanihata et al. | |
| 2011/0036117 A1 | 2/2011 | Frohling et al. | |
| 2011/0167849 A1 | 7/2011 | Kobayashi et al. | |
| 2011/0167850 A1 | 7/2011 | Itoh et al. | |
| 2012/0011869 A1 | 1/2012 | Kondo et al. | |
| 2012/0175081 A1* | 7/2012 | Katoh | 165/104.14 |

FOREIGN PATENT DOCUMENTS

| | | |
|---|---|---|
| DE | 102006033239 A1 | 2/2007 |
| DE | 102007024892 A1 | 12/2007 |
| DE | 60316378 T2 | 1/2008 |
| DE | 102007007233 A1 | 9/2008 |
| DE | 102010024853 A1 | 12/2010 |
| DE | 102010025779 A1 | 1/2011 |
| DE | 102010026354 A1 | 2/2011 |
| DE | 102009028522 A1 | 5/2011 |
| DE | 102011100198 A1 | 11/2011 |
| DE | 102011100301 A1 | 11/2011 |
| DE | 102010038406 A1 | 1/2012 |
| DE | 102010051471 A1 | 5/2012 |
| DE | 102011015151 A1 | 5/2012 |
| DE | 102010056283 A1 | 6/2012 |
| EP | 1522438 A1 | 4/2005 |
| EP | 1646519 A1 | 4/2006 |
| EP | 2447096 A1 | 5/2012 |
| EP | 2447097 A2 | 5/2012 |
| FR | 2743027 A1 | 7/1997 |
| WO | 2009146856 A1 | 12/2009 |
| WO | 2011086683 A1 | 7/2011 |
| WO | 2011087001 A1 | 7/2011 |
| WO | 2011125694 A1 | 10/2011 |
| WO | 2012028307 A1 | 3/2012 |
| WO | 2012045975 A1 | 4/2012 |
| WO | 2012060132 A1 | 5/2012 |
| WO | 2012098966 A1 | 7/2012 |

* cited by examiner

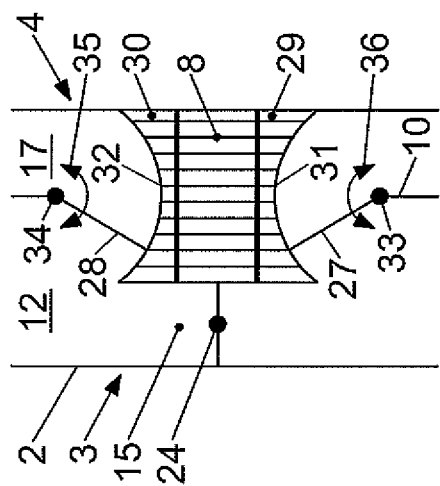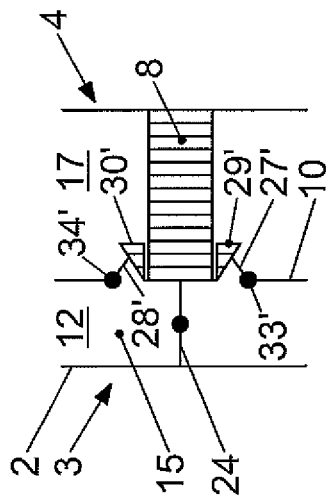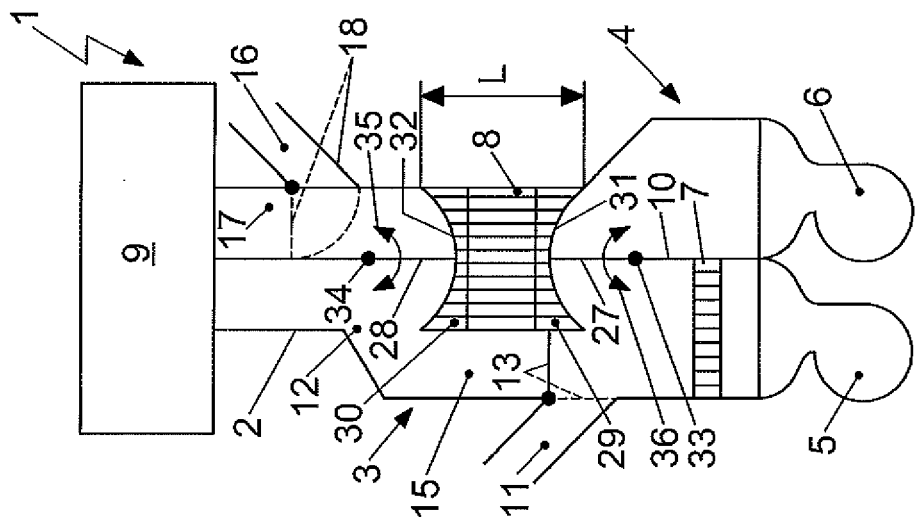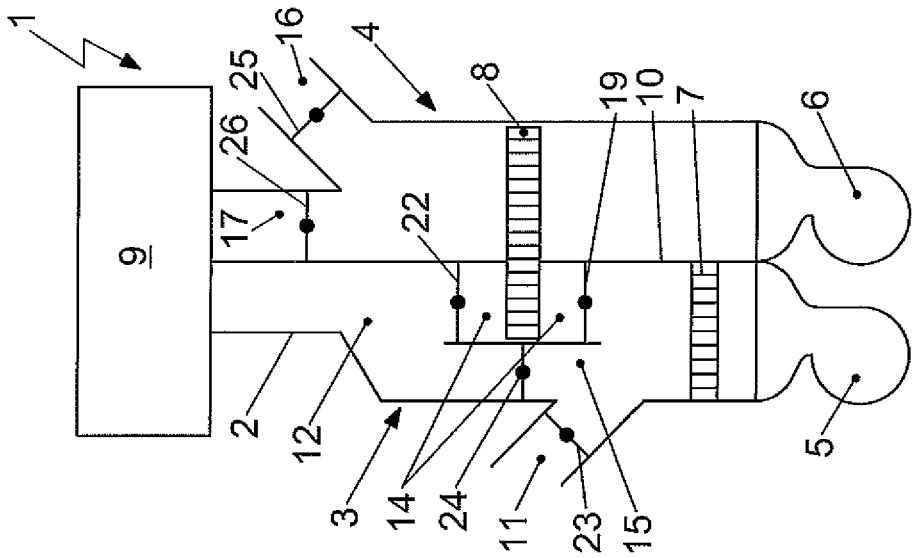

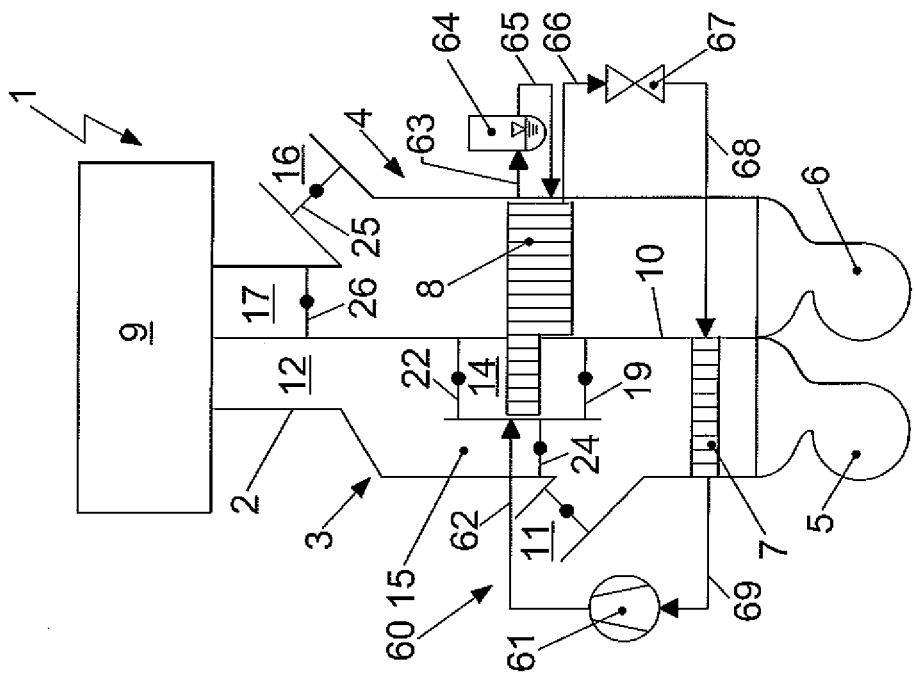
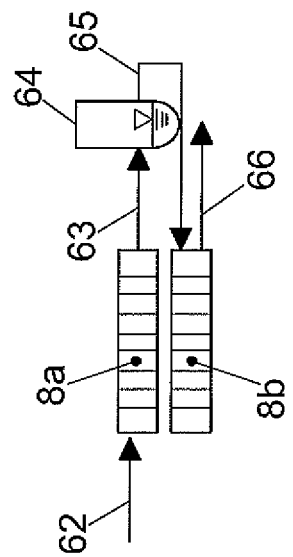
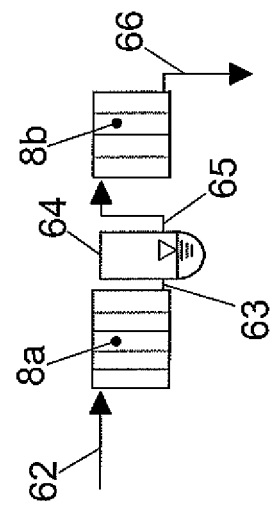
FIG. 4
FIG. 5a
FIG. 5b

HEAT EXCHANGER ARRANGEMENT AND AIR CONDITIONING SYSTEM OF A MOTOR VEHICLE

CROSS-REFERENCE TO RELATED APPLICATION

This application claims priority to German Non-Provisional Patent Application Serial No. DE 10 2012 108 886.1 filed Sep. 20, 2012, hereby incorporated herein by reference in its entirety.

FIELD OF THE INVENTION

The invention relates to a heat exchanger arrangement for heating of air with a heat exchanger integrated into a refrigerant circuit, which can be impinged or one side by refrigerant and on the other side by air. The heat is transferred from the refrigerant to the air. Additionally the invention relates to an air conditioning system for treating the air of a passenger compartment of a motor vehicle which includes the heat exchanger arrangement. The air conditioning system exhibits a housing with a first and a second flow channel for directing the air and the refrigerant circuit with a first heat exchanger, a compressor, the second heat exchanger, which corresponds to the heat exchanger of the heat exchanger arrangement, and an expansion device, wherein the first heat exchanger is situated in the first flow channel and the second heat exchanger in the second flow channel. In addition the invention relates to a method for running the air conditioning system for a combined cooling-unit and heating mode, as well as for a reheating operation for treating the air of the passenger compartment in reheating mode.

BACKGROUND OF THE INVENTION

Air conditioning units, which long have been prior art for motor vehicles, comprise refrigerant circuits with various individual components, like the condenser traditionally situated in the vehicle front end, the compressor connected to the vehicle engine and driven by it, the vaporizer situated in the passenger compartment, as well as hoses and connections. The air conditioner treats the air which then is directed into the passenger compartment. The compressor is usually driven from the engine of the motor vehicle by coupling the mechanical energy of the engine to the compressor shaft. Cooling fans and blowers are fed electrically from the 12-volt onboard network.

Heat is withdrawn at a high pressure level from gaseous refrigerant compressed in the compressor. In subcritical operation, the superheated refrigerant is cooled to the condensation temperature and then liquefied at a constant temperature. Thereafter, the completely liquefied refrigerant is further cooled in the condenser. The refrigerant is supercooled, with the supercooling relating to the constant condensation temperature. The range of the condenser in which the refrigerant is supercooled is also designated as the supercooling range. At the outlet of the condenser, the refrigerant usually exhibits a temperature that is about 5 K to 10 K below the condensation temperature.

In its installed position in the front end of the motor vehicle, the condenser is perpendicular to the air flow direction and for the most part has available a large network surface, which in small vehicles exhibits values in the area from 14 $dm^2$ to 18 $dm^2$; in vehicles in the compact class exhibits values in the range from 20 $dm^2$ to 22 $dm^2$; and in larger vehicles exhibits values above 24 $dm^2$.

To be understood, a network surface is the surface at the entry or at the exit of the heat exchanger, essentially perpendicular to the flow direction of the air, also designated as the flow surface. The network surface comprises the ribbed area, or area configured with ribs of the heat exchanger, and it corresponds to the air-side flow cross section.

Traditional blowers of the condensers, also designated as cooling fans, are configured as axial fans and as suction fans at the outlet of a cooling module. Since axial fans are designed to deliver a large volume flow of air at a slight pressure difference, the heat exchangers situated in the cooling module, like the coolant cooler of the engine cooling circuit, the charge air cooler, or the condenser of the refrigerant circuit, are configured for reduction of the flow resistance with as small as depth as possible. The heat exchangers have air flowing through them one after the other on the air side. Depth is to be understood as the thickness of the heat exchanger in the flow direction of the air or the flow length on the air side.

The depth of the condenser known from prior art exhibits a value in the range from 12 mm to 16 mm. Due to the low length of flow on the air side and the large amount of air, the mass air flow is only slightly warmed when flowing through the entirety of the condenser. The mass air flow in the entry area of the condenser on the refrigerant side is considerably more heated due to the superheating of the refrigerant with temperatures above the condensation temperature than in the outlet area of the condenser on the refrigerant side, in which the refrigerant already is present in a condensed state and if necessary is supercooled.

Generic air conditioners with coolant-air heat exchangers, which relate to the heating performance from the refrigerant circuit of an efficient internal-combustion engine of the vehicle prime mover, at low ambient temperatures, for example lower than −10° C., no longer reach a temperature level required for comfortable heating of the vehicle passenger compartment. The same holds true for units in vehicles with a hybrid drive. For these vehicles, use of heating concepts is necessary.

Glycol-air heat pumps also use the coolant of the internal combustion engine, but as a heat source. With this, heat is withdrawn from the coolant. As a consequence of this, the internal combustion engine is run for a longer time at low temperature, which has a negative effect on exhaust emissions and fuel consumption. Due to the internal combustion engine operating intermittently in hybrid vehicles, during longer trips the coolant temperature does not become sufficiently high. As a consequence, the internal combustion engine is subjected to start-stop operation at low ambient temperature. The internal combustion engine is not shut off.

Additionally, there is a trend toward complete electrification of the drive train, as for example in vehicles driven by batteries or fuel cells. Here there is no waste heat from the internal combustion engine as a possible heat source for heating the air.

Furthermore, the amount of energy storable in the vehicle battery is less than the amount of energy storable in the form of liquid fuel in the fuel tank. Thus, the power needed to air-condition the passenger compartment of an electric vehicle has a considerable influence on the range of the vehicle.

In DE 10 2009 028 522 A1 a compact air conditioner is described with a vaporizer unit, a condenser unit, and a component unit as well as a refrigerant circuit. The vaporizer unit and the condenser unit both exhibit heat exchangers through which air flows, placed in a housing, as well as a blower. The refrigerant circuit, comprising a vaporizer, a condenser and a reheater, is configured for a combined cooler unit and heat pump operation, wherein in the reheater mode the heating power of the reheater is configured as a condenser-gas cooler and the cooling power of the vaporizer can be controlled independent of each other. The operational modes of the air conditioner are controlled by the refrigerant circuit. Thus, the air conditioner carries out the function of a heat pump, which is implemented by means of active switching within the one primary circuit and a secondary refrigerant circuit exhibiting a secondary branch formed from two flow paths. However, the configuration of the refrigerant circuit with switchover valves results in great complexity, which in turn leads to high costs and high technical expense.

From FR 2 743 027 A1 is derived a vehicle air conditioner with a traditional refrigerant circuit exhibiting only a vaporizer, a compressor, a condenser, and an expansion device. The heat exchangers are situated in separate flow channels, designed to be segregated from each other at least in flow terms. The flow channels exhibit cross connections or bypasses. The mass air flows brought in by suction using blowers are forwarded by closing and opening flaps as well as through passage via the bypasses, depending on the requirement and operating mode via the surfaces of the heat exchangers. The mass air flows are cooled and/or demoisturized or heated as well as then passed into the passenger compartment and/or the ambient environment.

Thus, air conditioners are known from prior art for vehicles for a combined cooling-unit and heat-pump operation with air as the heat source for heating, cooling, and demoisturizing the air to be fed to the passenger compartment and to be treated. The air conditioners are regulated either on the refrigerant-circuit side or the air side.

With the air conditioners controlled on the air side, however, no operation is possible in the reheating mode, also designated as Reheat. The air conditioners configured for additional reheating operation exhibit in turn a complicated refrigerant circuit with a plurality of components such as heat exchangers, switchover valves, and expansion valves.

In the Reheat or reheating mode the air to be fed to the passenger compartment is cooled and demoisturized in the process, then the demoisturized air is slightly heated up. In this operational mode, the required reheating power is at least less than the required cooling power for cooling and demoisturizing the air.

With the known air conditioners controlled on the air side, with a heat pump function, both in the cooling-unit operation and in the heat-pump operation, the vaporizer is operated as a vaporizer, and the condenser as a condenser. The heat flows are fully controlled via the air-side flow guidance. It is not necessary to switch the operation of a heat exchanger to the one as a condenser and to the other as a vaporizer.

However, condensers designed for heat-pump operation exhibit less transmission power than condensers designed for heating-unit operation. The condensers for heat-pump operation have less of a mass air flow through them and must cause a larger alteration of the air temperature.

According to the prior art, in heat pump systems, condensers are used with the structural space of a heat exchanger through which coolant of the engine cooling system flows. For this reason, these are configured as multi-row (for example, two-row) cross counterflow-heat exchangers with a designed depth of about 40 mm and a flow surface of about 4 $dm^2$. Condensers with a designed depth of about 40 mm and a flow surface of about 4 $dm^2$, when in operation as dual-row cross counter-flow heat exchangers, can heat a mass air flow in the range of 250 kg/h to 400 kg/h to a temperature which is about 5 K to 15 K below the condensation temperature of the refrigerant.

If the heat exchanger is run both in the cooling-unit operation and in heat-pump operation as a condenser, arrangement of the condenser in the cooling module of the motor vehicle does not make sense.

Due to the large structural shape of condensers for the cooling unit operation as known in prior art, i.e., with a large flow cross section on the air side, it is almost impossible to place the condenser in an area in the vehicle other than the cooling module.

On the other hand, with one designed in the structural form of a condenser configured for heat-pump operation, the required power for cooling unit operation is not transferable. In addition, the mass air flow cannot be heated to, or at all above, the condensation temperature of the refrigerant.

SUMMARY OF THE INVENTION

The task of the present invention is to make available a heat exchanger arrangement for heating of air, wherein the air should be heated by means of a refrigerant flowing through the heat exchanger. The air should be able to be heated efficiently to a maximum temperature.

A further task of the present invention is to make available an air conditioning system with a heating function, especially for use in motor vehicles. The refrigerant circuit of the air conditioning system should be configured with a minimum number of components, and thus be cost-effective and undergo little maintenance. In addition, the air conditioning system should be designed for combined cooling-unit and heat-pump operation, as well as reheating operation for heating, cooling, and moisturizing the air to be treated for the passenger compartment. Operation should also be possible in environments with low-capacity heat sources, such as energy-efficient internal combustion engines or hybrid prime movers made up of internal combustion engines and electric motors or with no heat sources present in the prime mover, as for example with electric-powered vehicles, meeting all requirements for a comfortable climate in the passenger compartment. The air conditioning system should be able to be very efficiently run with the heat exchanger arrangement for release of heat to the air.

In addition, the task that is the basis for the invention is to make available a method for running the air conditioning system, with which efficient operation is possible, especially in reheating operation.

According to the invention, the problem is solved by a heat exchanger arrangement for heating of air which exhibits a heat exchanger integrated into a refrigerant circuit. On the one side the heat exchanger can have refrigerant flowing through it, and on the other side it can be impinged on by air, so that heat from the refrigerant can be transferred to the air. The refrigerant is relieved of heat, condensed, and supercooled during the transfer of heat.

According to the concept of the invention, the heat exchanger exhibits two components configured to be segregated from each other. The first component is designed with a condensation and heat-dissipation surface and the second component is designed with a supercooling surface. After the entry of the refrigerant into the first component of the heat exchanger run as a condenser, the refrigerant present as superheated vapor or gas has heat removed, i.e., cooled until the condensation temperature is reached. Through further transfer of heat from the refrigerant to the mass air flow, the refrigerant is liquefied at a constant temperature, the condensation temperature. Then the liquefied refrigerant is directed from the first component into the second component of the heat exchanger and cooled within the second component due to further heat release to a temperature below the condensation temperature. The supercooling relates to the temperature at the outlet of the second component, which is below the condensation temperature.

Between the two components of the heat exchanger designed to be separated from each other, on the refrigerant side, a refrigerant-phase separation element is placed. With the aid of the phase separation, it is ensured that exclusively liquid refrigerant is directed into the second component, which is configured with the supercooling surface. Refrigerant in a purely liquid phase advantageously exhibits a lower volume than liquid refrigerant with a gaseous share or a two-phase refrigerant.

A plenum with an integrated liquid separation is preferably used as the refrigerant-phase separation element.

According to the invention, the heat exchanger of the heat exchanger arrangement is configured as a tubular heat exchanger with tubes situated in a row. The first component exhibiting the condensation and heat-removal surface is configured to have at least two rows, while the second component exhibiting the supercooling surface is configured to have at least one row.

According to an embodiment of the invention, the first component exhibits at least the same number of tube rows as the second component. However, preferably the first component is configured with at least double the number of tube rows as the second component. Thus the first component is advantageously configured with four tube rows, while the second component exhibits two tube rows.

According to a first alternative, all the tube rows have single-passage flow passing through them. The tube rows are advantageously directed perpendicular to the air flow direction. The refrigerant flows in a direction parallel through all the tubes of a tube row, before it then is directed through the tubes of the following tube row. In this way the tubes of various tube rows have flows passing one after the other through them on the refrigerant side. The refrigerant can flow from one tube row to the following tube row either in, or opposite to, the flow direction on the air side.

According to a second alternative, the heat exchanger to be run as a condenser is configured so that at least one row of the plurality of tube rows has multiple-passage flows passing therethrough. The refrigerant is directed through some tubes of a tube row in a first direction, while it flows through other tubes of the same tube row in a second direction situated opposite to the first direction. The refrigerant flows parallel through the tubes of the tube row.

The mass air flow flowing through the heat exchanger of the heat exchanger arrangement is able to be heated according to the invention to a temperature level which is higher than the temperature level of the refrigerant condensation.

The heat exchanger is advantageously configured as a cross-counter-flow heat exchanger.

According to a further development of the invention, the heat exchanger exhibits a flow surface in the range from 2 dm$^2$ to 10 dm$^2$, preferably in the range from 4 dm$^2$ to 5 dm$^2$. With this flow surface, the heat exchanger is usable as a condenser both in cooling-unit operation and also in heat-pump operation of an air conditioning system of a motor vehicle to transmit the particular required power.

Advantageously, the heat exchanger is configured of planar tubes which are directed perpendicular to the air flow direction. The planar tubes exhibit a width of greater than 8 mm. A planar tube width in the range from 11.5 mm to 18 mm is preferred. It is advantageous to configure the planar tubes with a width of 12.3 mm or 16 mm. By width of the planar tubes, what is meant is the extent of the tubes in the air flow direction.

According to an alternative embodiment of the invention, the heat exchanger is configured of planar tubes which are inclined vis-à-vis the flow direction of the air in the longitudinal direction at a certain angle. Advantageously the inclination exhibits values between 30° and 60°. Thus, depending on the inclination angle, the effective extension of the planar tubes or the effective path is increased, which the mass air flow covers when flowing through a tube row.

According to a further development of the invention, the heat exchanger of the heat exchanger arrangement is equipped with ribs on the air side. The ribs preferably are arrayed at an interval of less than 100 ribs per dm. It is advantageous to arrange the ribs with an interval of 65 to 75 ribs per dm.

To optimize the heat transmission between the refrigerant and the air, according to an alternative embodiment of the invention, the heat exchanger is configured on the air side with a porous medium, which is arranged between the planar tubes. Preferably, open-pored metallic foam is used as the porous medium due to its good thermal conductivity. Additionally, it is advantageous to use a metallic foam with a porosity between 75% and 90%, as well as pore density in a range from 5 ppi to 40 ppi, to keep pressure losses low on the air side.

According to a further advantageous embodiment of the invention, the heat exchanger is configured and arranged so that the first component exhibiting the condensation and heat-removal surface and the second component exhibiting the supercooling surface are able to be impinged on in parallel by air.

Advantageously, the heat exchanger arrangement exhibits an air guidance device around the heat exchanger for dividing the heat transmission surface into at least two sections, which can be impinged on by differing mass air flows. A first section is adjustable in a range from 0% to 100% of the entire heat transmission surface of the heat exchanger, while the second section exhibits the remaining range from 100% to 0%.

According to a first alternative arrangement, the division can be regulated by means of the air guidance device. What is meant by regulation is a continuous stageless adjustment of the division between 0% and 100%. According to a second alternative embodiment, the division is static, and thus not able to be regulated or adjusted.

The heat transmission surface of the heat exchanger is preferably divided into ranges of 0% to 30% and 100% to 70% respectively of the overall surface.

The problem of providing a system with a heating function is solved by an air conditioning system for treating the air of a passenger compartment of a motor vehicle with a heat exchanger arrangement already described. The air conditioning system exhibits a housing with a first and a second flow channel for directing air as well as the refrigerant circuit with a vaporizer, a first heat exchanger, a compressor, a second heat exchanger, and an expansion device, wherein the first heat exchanger is situated in the first flow channel and the second heat exchanger in the second flow channel. The second heat exchanger corresponds to the heat exchanger of the invention-specific heat exchanger arrangement.

According to the concept of the invention, the air conditioning system is configured for combined cooling-system and heat-pump operation for cooling and for heating the passenger compartment, as well as for a reheating operation. The particular operational mode is adjusted solely via controlling the air guidance devices within the housing of the air conditioning system, and not by controlling the refrigerant circuit.

According to the invention, the second heat exchanger is configured and operable independent of the operational mode as a condenser for heating a mass air flow so that the powers required in the particular operational mode can be transferred to the mass air flow directed via the heat transfer surface.

The second heat exchanger configured as a condenser has flow passing through both in the cooling-unit operation and in the heat-pump operation on the refrigerant side and the air side, in the same direction.

The first heat exchanger is preferably configured as a vaporizer independent of operational mode, and is run for cooling and/or demoisturizing a mass air flow.

With the heat exchanger arrangement, especially the heat exchanger run as a condenser, in the heat-pump operation, advantageously, a mass air flow of over 100 kg/h, preferably of about 250 kg/h, with an air entry temperature in the condenser of lower than +10° C., preferably lower than 0° C., can be heated to a temperature which is over the condensation temperature, preferably more than 10 K over the condensation temperature, of the refrigerant in the refrigerant circuit.

For example, a mass air flow of 250 kg/h and an air entry temperature into the condenser of −20° C. can be heated to a temperature which is 15 K above the condensation temperature of the refrigerant in the refrigerant circuit, and a power in the range from 1 kW to 8 kW can be transmitted, wherein for example at an ambient temperature of −10° C., a power in the range from 2 kW to 6 kW, preferably in the range from 3.5 kW to 4.5 kW, can be transferred, as well as, advantageously, in the cooling-unit operation, a mass air flow of lower than 2000 kg/h, preferably of about 1000 kg/h, with an air entry temperature into the condenser of above +10° C., preferably above +30° C., is heated to a temperature which is above the condensation temperature, preferably 10 K above the condensation temperature of the refrigerant in the refrigerant circuit, and, a power of more than 2 kW can be transferred, wherein for example at ambient temperatures of over +30° C., a power in the range from 2 kW to 15 kW, preferably of about 10 kW, can be transferred.

The air conditioning system with a heat-pump function, i.e. with the cooling and/or demoisturizing of a first mass air flow and simultaneous heating of a second mass air flow, is advantageously able to be run in a reheating operation, also designated as a reheat mode. The reheating operation is possible as a pure reheating operation, i.e. with no mixture of non-treated air.

The processes of cooling and/or demoisturizing of the air as well as heating or reheating of the air is controlled only on the air side. The refrigerant circuit is run independent of the different operational modes.

The invention-specific method for operating the air conditioning system for a combined heating-unit and heat-pump operation for cooling and for heating, as well as for a reheating operation for treating the air of a passenger compartment of a motor vehicle comprises the following steps in the reheating mode: conduction of a first partial mass air flow and a second partial mass air flow into the air conditioning system; division of the second partial mass air flow after the overflowing of a first heat exchanger configured and run as a vaporizer into a partial mass air flow for reheating and a cold mass air flow; heating of the first partial mass air flow and of the partial mass air flow for reheating during overflow of the heat transfer surface of a second heat exchanger configured and run as a condenser to a temperature above the condensation temperature of the refrigerant, wherein the first partial mass air flow is heated; and, the partial mass air flow for reheating is reheated; as well as the heating power being regulated on the air side; conduction of the first partial mass air flow into the environment of the motor vehicle; mixing of the reheated partial mass air flow with the previously treated cold mass air flow; wherein the cold mass air flow, upon overflowing of the first heat exchanger designed and run as a vaporizer is cooled and/or demoisturized; the heating power transferred by means of the second heat exchanger for reheating is regulated via the shares of the second partial mass air flow; the temperature of the mixed mass air flow is detected by a temperature sensor situated in the mass air flow, and regulated via the pressure level of the refrigerant in the condenser; and, transfer of the mixed second partial mass air flow into the passenger compartment.

What is understood by heating is the process of heating the first partial mass air flow upon overflowing of a first area of the second heat exchanger configured and operated as a condenser. The first partial mass air flow is directed into the air conditioning system and heated.

What is understood by reheating is the process of heating a part of the second partial mass air flow upon overflowing of a second area of the heat exchanger configured and run as a condenser. The second partial mass air flow is directed into the air conditioning system, upon overflowing of the first heat exchanger configured and run as a vaporizer is cooled and/or demoisturized and then again heated. This repeated heating is designated as reheating.

According to a further development of the invention, the mass air flow overflowing the heat transfer surface of the condenser exhibits a value lower than 2000 kg/h. The value of the mass air flow preferably is about 1000 kg/h.

Advantageously, the heating power exhibits a value greater than 2 kW.

An additional invention-specific method for running the air conditioning system for a combined cooling-unit and heat-pump operation for cooling and for heating, as well as for a reheating for treatment of the air of a passenger compartment of a motor vehicle, comprises the following steps in the reheating mode: impinging on a first area of a heat exchanger configured and run as a condenser with a first partial mass air flow and impinging on a second area of the second heat exchanger with a second partial mass air flow, wherein the partial mass air flows exhibit differing temperatures and/or differing absolute air humidities; regulating the power transferred from the second heat exchanger by dividing of surfaces of the areas of the second heat exchanger and the first partial mass air flow directed through the first area of the second heat exchanger; diversion of the first partial mass air flow directed through the first area of the second heat exchanger into the environment of the motor vehicle; regulating the temperature of the second partial mass air flow directed through the second heat exchanger via the pressure level of the refrigerant in the second heat exchanger, wherein the temperature is detected by means of a temperature sensor placed in the flow direction of the air after the second heat exchanger; and direction of the second partial mass air flow directed through the second area of the second heat exchanger into the passenger compartment.

An alternative invention-specific method for running the air conditioning system for a combined cooling-unit and heat-pump operation for cooling and for heating as well as for a reheating operation for treating the air of a passenger compartment of a motor vehicle comprises the following steps in the reheating mode: impinging on a first area of a second heat exchanger configured and run as a condenser with a first partial mass air flow; division of a second partial mass air flow after the overflow of a first heat exchanger configured and run as a vaporizer in a partial mass air flow for reheating and a cold mass air flow; as well as impinging on a second area of the second heat exchanger with the partial mass air flow for reheating; regulating the heating power for reheating by dividing the surfaces of the areas of the second heat exchanger and the partial mass air flow directed through the first area of the second heat exchanger as well as via the shares of the second partial mass air flow; release of the partial mass air flow directed through the first area of the second heat exchanger into the environment; mixing of the reheated partial mass air flow with the previously treated cold mass air flow; regulating the temperature of the partial mass air flow directed through the second area of the second heat exchanger via the pressure level of the refrigerant in the second heat exchanger, wherein the temperature is detected by means of a temperature sensor placed in the air flow direction after the second heat exchanger; and directing the mixed second partial mass air flow into the passenger compartment.

It is advantageous that the first and the second partial mass air flow upon overflowing the heat transmission surfaces of the second heat exchanger are not mixed, or only in a negligible way.

According to one embodiment of the invention, the power transferred by the condenser through the partial mass air flow directed through the second area of the condenser is regulated by an air guidance device situated in the air flow direction before the condenser.

To summarize, the invention-specific solution exhibits various advantages: an efficient air conditioning system for simultaneous demoisturizing and heating; rapid provision of warm air at a low ambient temperature and cold engine coolant water in motor vehicles with an internal combustion engine; minimum complexity in the refrigerant circuit, i.e., in essence doing without switchover valves and minimization of the number of expansion valves, heat exchangers, and refrigerant lines; heating of the air to be fed to the passenger compartment in heat-pump mode or of the air to be diverted to the environment in cooling-unit operation to as high a temperature as possible, which is higher than the condensation temperature of the refrigerant in the refrigerant circuit; making heating power available at a lower maximum pressure level in comparison with traditional heating systems and thus increasing efficiency of the air conditioning system, especially when operated in the heat-pump mode; as well as a reduction of costs, since a condenser with a suitable air guide in the compact air conditioner in comparison to a traditional system replaces the condenser in the refrigerant circuit used in the cooling unit mode and the heating warmth exchanger in the engine cooling circuit.

BRIEF DESCRIPTION OF THE DRAWINGS

Further particulars, features and advantages of the invention are derived from the following specification of embodiment examples with reference to the pertinent drawings. Show are:

FIG. 1: an air conditioning system with closed air guidance devices;

FIG. 2: an air conditioning system with a centrally placed condenser;

FIG. 3a: a centrally placed condenser with an air guidance device for division of the mass air flows in a single depiction;

FIG. 3b: a condenser assigned to a flow channel with an air guidance device;

FIG. 4: an air conditioning system as per FIG. 1 with the complete refrigerant circuit; and FIGS. 5a, 5b: configuration and arrangement of the condenser in the refrigerant circuit.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner.

FIG. 1 shows an air conditioning system 1 with a housing 2, exhibiting a first flow channel 3 and a second flow channel 4, wherein a blower 5, 6 is assigned to each flow channel 3, 4 and is able to be impinged on by fresh air from the ambient environment, recirculated air from the passenger compartment 9, or a mixture of the two.

A vaporizer 7 is placed in the first flow channel 3, and a condenser 8 is placed in the second flow channel 4, with both configured as components of a refrigerant circuit of the air conditioning system 1 and as air-impinged heat exchangers. The vaporizer 7 admits the entire flow cross section of the flow channel 3. The condenser 8 is situated to overlap the flow channel and exhibits two areas. The first area is situated within the second flow channel 4, overlapping the entire flow cross section, and has a larger heat transmission surface as compared to the second area. The condenser 8 penetrates in its extension into the first flow channel 3, so that the second area of the condenser 8 is situated within the flow path 14 of the first flow channel 3. The second area of the condenser 8 admits the entire flow cross section of the flow path 14. The areas of the condenser 8 are divided by the partition 10 between the flow channels 3, 4.

The arrangement of the condenser 8 to overlap the flow channel as per FIG. 1 produces a non-regulable division of the heat transmission surfaces into two areas. The condenser 8 is subdivided into areas of 0% to 100%, but preferably from 0% to 30% of the entire heat transmission surface. With the subdivisions of 0% and 100% respectively, the condenser 8 is situated completely in one of the flow channels 3, 4. With a heat transmission arrangement with 30% division of the heat transmission surface, 30% of the surface of the flow is within channel 3 and 70% within flow channel 4.

The separately governable blowers 5, 6 cause an advantageous dynamic of the air conditioning system 1, since the first flow channel 3 with the vaporizer 7 and the second flow channel 4 with the condenser 8 can be impinged on by mass air flows with different speeds and thus it is possible to react quickly to altered operating states.

The blower 5 of the first flow channel 3 guides the air brought by suction as a mass air flow to the vaporizer 7. Upon overflowing the heat transfer surfaces of the vaporizer 7, the mass air flow is cooled and/or demoisturized.

The cold mass air flow emerging from the vaporizer 7 is divided as a partial mass air flow via the cold-air flow path 11 into the ambient environment and into a partial mass air flow via the cold-air flow path 12 into the passenger compartment 9 in a required ratio, or is assigned in full to one of the cold-air flow paths 11, 12. The cold-air mass flow is divided by means of the air direction devices 23, 24 configured as flaps. The mass air flow guided through the cold-air flow path 12 is directed around on flow path 14 and thus as a bypass flow through the bypass channel 15 about the condenser 8.

Analogous to blower 5, blower 6 brings air by suction and guides the suctioned air as a mass air flow to the condenser 8. Upon overflowing the heat transfer surfaces of the condenser 8, the mass air flow is heated.

The warm mass air flow emerging from the condenser 8 is divided as a partial mass air flow via the warm-air flow path 16 into the ambient environment and into a partial mass air flow via the warm-air flow path 17 into the passenger compartment 9 in a required ratio, or assigned in full to one of the warm-air flow paths 16, 17. The warm mass air flow is divided by air guidance devices 25, 26 configured as flaps.

The particular two flaps 23, 24 and 25, 26 can each be coupled by a kinematic device and adjusted by means of a single drive.

With a cold-unit mode, i.e. cooling of the air to be directed into the passenger compartment 9, the air guidance devices 19, 22 are closed. The air guidance devices 23, 24 are aligned so that the mass air flow is directed through cold-air flow path 12 to the passenger compartment 9, while cold-air flow path 11 is closed. The air guidance devices 25, 26 are aligned so that the mass air flow is guided through the warm-air flow path 16 into the ambient environment, while the warm-air flow path 17 to the passenger compartment 9 is closed.

The blower 5 directs the air through the first flow channel 3 to the vaporizer 7. The air is cooled and demoisturized and flows through the cold-air flow path 12 into the passenger compartment 9. The blower 6 directs the air in the second flow channel 4 to the condenser 8. The air is heated and brought through the warm-air flow path 16 into the ambient environment.

With heat-pump operation, i.e. heating of the air to be directed to the passenger compartment 9, the air guidance devices 23, 24 are so aligned that the mass air flow is directed through the cold-air flow path 11 into the ambient environment, while the cold-air flow path 12 is closed. The air guidance devices 25, 26 are aligned so that the mass air flow is directed through the warm-air flow path 17 to the passenger compartment 9, while the warm-air flow path 16 is closed. The air guidance devices 19, 22 are closed.

The blower 5 feeds the air through the first flow channel 3 to the vaporizer 7. The air is cooled and flows through the cold-air flow path 11 into the ambient environment. The blower 6 feeds the air through the second flow channel 4 to the condenser 8. The air is heated and gets through the warm-air flow path 17 into the passenger compartment 9.

During reheating operation, the air guidance devices 19, 22, 23, 24, 25, 26 are placed as needed in various positions between completely open and completely closed. Through the settings of the air guidance devices 23, 24, 19, 22 as well as the r.p.m.s of the blower 5, the mass air flow to be heated up is varied. The area of the condenser 8 situated in flow path 14 is usable only for the reheating mode.

Alternatively, the air guidance devices 23, 24 and 25, 26 configured as two segregated flaps can as well be configured as one flap 13 and 18, with flap 13 situated within the cold-air flow path 11, 12 and flap 18 within the warm-air flow path 16, 17, which can also be gleaned from FIG. 2. The flap 13 is adjustable between the first limit position, in which the cold-air flow path 11 is fully open and the cold-air flow path 12 is fully closed, and the second limit position, in which the cold-air flow path 12 is fully open and the cold-air flow path 11 is fully closed. In the same way, the flap 18 can be positioned between the first limit position, in which the warm-air flow path 17 is fully opened and the warm-air flow path 16 is fully closed, and the second limit position, in which the warm-air flow path 16 is fully opened and the warm-air flow path 17 is fully closed.

With the embodiment form as per FIG. 2, the condenser 8 is situated centrally within the flow channels 3, 4. What is to be understood by situated centrally is an alignment of the condenser 8 in relation to the partition 10, which subdivides the condenser 8 into two equal-sized areas. The first area is situated within the second flow channel 4 and covers the entire flow cross section of the flow channel 4. The second area of the condenser 8 is situated within the first flow channel 3 and only covers a partial cross section of flow channel 3. The flow cross section not covered by the condenser 8 corresponds to the bypass channel 15 of the embodiment form according to FIG. 1.

The first and the second flow channel 3, 4 are segregated from each other by the partition 10 as well as by two additional air guidance devices 27, 28 configured as movable flaps and by static air guidance devices 29, 30 configured as air guidance baffles. The mass air flow guided through the condenser 8 is determined according to the r.p.m. of the blower 6 and the setting of the air guidance devices 27, 28.

The air guidance devices 27, 28 and the air guidance baffles 29, 30 that exhibit shapes adjusted to each other, form an air guidance device for the heat exchanger and serve to prevent a mixing of the cooled and treated mass air flow while flowing through the vaporizer 7 within the first flow channel 3 with the non-treated mass air flow of the second flow channel 4.

The air guidance baffles 29, 30 are situated parallel to the partition 10, so that the mass air flows flowing along the partition 10, when encountering the air guidance baffles 29, 30 and when flowing past or through, experience no turn-around in the flow direction.

The air guidance baffles 29, 30 that are each situated to both sides into the flow channels 3, 4 exhibit an increasing length L into the flow channels 3, 4 and thus more distance from the partition 10. The more distant the air guidance baffles 29, 30 are situated from the partition 10, the greater the length L of the air guidance baffles 29, 30 is, wherein the lengths L of the air guidance baffles 29, 30, situated next to each other, increase, so that the ends of the overall arrangement of the air guidance baffles 29, 30 form two concave-shaped surfaces 31, 32.

The surfaces 31, 32 are each configured as rectangles and are uniformly bent about an axis 33, 34 which are aligned parallel to the surfaces 31, 32 so that the first two opposite-placed side edges of a rectangular surface 31, 32 each form a straight line, while the second two opposite-placed side edges describe a circular arc. The midpoints of the circular arcs each represent the axis 33, 34 about which the rectangular surface 31, 32 is bent. Thus the axes 33, 34 correspond to the rotational axes 33, 34 of the movable air guidance devices 27, 28. The radii of the surfaces 31, 32 bent into circular-arc shapes, correspond to the longitudinal extension of the air guidance devices 27, 28, i.e., the extension of the movable air guidance devices 27, 28 in the flow direction of the mass air flows through the flow channels 3, 4.

The pivoting air guidance devices 27, 28 are aligned with the side edge turned away from the rotational axis 33, 34 clamped from the ends of the air guidance baffles 29, 30 to the surface 31, 32 with concave curvature. For free mobility of the air guidance devices 27, 28 there remains a minimum-width gap between the surface 31, 32 and the side edge of the air guidance device 27, 28, which has no, or only a negligible, influence on the flowing of the mass air flow.

By simultaneous turning of the air guidance devices 27, 28 about the particular rotational axis 33, 34 in the opposite turning direction 35, 36, the share of the areas of the condenser 8 is adjustable in the first flow channel 3 and in the second flow channel 4. The areas of the condenser 8 can thus be in essence continuously adjusted without stages. Possible stages within the twisting of the air guidance devices 27, 28 can be derived from the distances of the air guidance baffles 29, 30 perpendicular to the flow direction of the mass air flows through the flow channels 3, 4. After the twisting, the air guidance devices 27, 28 are aligned so that the side edges, situated to be parallel to turning axis 33, 34 and facing away from turning axis 33, 34, sit opposite one end of an air guidance baffle 29, 30 so that the mass air flow can flow along a through-running surface. The leakage flows that appear at intermediate settings of the air guidance devices 27, 28 in relation to the air guidance baffles 29, 30 are negligible. What is meant by an intermediate setting is a setting of the air guidance devices 27, 28 in which the side edges of the air guidance devices 27, 28 do not stand exactly opposite an edge of an air guidance baffle 29, 30, but rather is situated between two air guidance baffles 29, 30.

With a twisting of the air guidance devices 27, 28 in the turning directions 35, 36 up to the greatest longitudinal extension of the air guidance baffles 29, 30, i.e., until reaching the outer housing wall of the second flow channel 4, the entire condenser 8 is accommodated within the first flow channel 3. The air guidance devices 27, 28 are situated in the first limit position. With a twisting of the air guidance devices 27, 28 opposite the turning directions 35, 36 up to the greatest longitudinal extension of the air guidance baffles 29, 30, i.e. in the direction of the outer housing wall of the first flow channel 3 or in the direction of the bypass channel 15, respectively, the entire condenser 8 is situated within the second flow channel 4. The air guidance devices 27, 28 are in the second limit position. Along with the two limit positions, the air guidance devices 27, 28 are adjustable in intermediate positions. The central intermediate position is depicted in FIG. 2.

By simultaneous turning of the air guidance devices 27, 28 around the particular turning axis 33, 34 in an opposite turning direction 35, 36 and around the same angle, the share of the areas of condenser 8 can be adjusted in stageless continuous fashion.

With a purely cooling-unit mode or a purely heating mode, the air guidance devices 27, 28 are situated in the second limit position. The condenser 8 is situated with the heat transmission surface completely within the second flow channel 4.

In the cooling-unit mode, the air guidance device 13 opens the bypass channel 15 and closes the cold-air flow path 11 into the ambient environment so that the mass air flow brought in through blower 5 by suction, and upon overflowing the vaporizer 7, is cooled, demoisturized, and then directed through the bypass channel 15 and the cold-air flow path 12 into the passenger compartment 9. On the other side, the mass air flow fed through the blower 6 and heated upon overflowing the condenser 8 is brought through the warm-air flow path 16, which is opened by the air guidance device 18, into the ambient environment. The warm-air flow path 17 is closed.

The mass air flow that admits heat from the refrigerant in the second flow path 4 exhibits a value less than 2000 kg/h, preferably about 1000 kg/h. A power of more than 2 kW is transferred, and the mass air flow is heated to a temperature which is greater than the condensation temperature of the refrigerant.

With the heating mode, the air guidance device 13 opens the cold-air flow path 11 and closes the bypass channel 15, so that the cooled mass air flow brought in by suction through the blower 5 and upon overflowing the vaporizer 7 is brought through the cold-air flow path 11 into the ambient environment. On the other side, the heated air mass flow fed through the fan 6 and upon overflowing the condenser 8 fed through the warm-air flow path 17, which now is opened by the air guidance device 18, is directed into the passenger compartment 9, while the warm-air flow path 16 is closed.

The mass air flow admitting the heat from the refrigerant in the second flow channel 4 exhibits a value greater than 100 kg/h, preferably about 250 kg/h. Thus a power of more than 1 kW is transferred, and the mass air flow is heated to a temperature which is greater than the condensation temperature of the refrigerant. The mass air flow before the entry into the passenger compartment 9 exhibits a temperature which is over 10 K higher than the condensation temperature of the refrigerant.

In the reheating mode, according to a first alternative, a mass air flow of less than 2000 kg/h, preferably about 1000 kg/h, with a heating power of greater than 2 kW is heated to a temperature above the condensation temperature of the refrigerant. The mass air flow brought into the air conditioning system is divided into a first partial mass air flow, which after heating is directed into the ambient environment, and a second partial mass air flow. The second partial mass air flow is cooled and demoisturized and then divided into a partial mass air flow for reheating and a cold mass air flow, wherein the reheated partial mass air flow after the reheating is mixed with the cold mass air flow fed through the bypass 15.

The heating power for reheating is regulated by means of the air guidance devices 19, 22, 24 configured as flaps as per FIG. 1 as well as by means of the air guidance device 13, 24 configured as a flap as per FIG. 2 or FIG. 3a and FIG. 3b, and thus the partial mass air flows through the flow path 14 and the bypass channel 15, respectively. The partial mass air flow heated while flowing through the first area of the condenser 8 is directed through the opened flap 25 as per FIG. 1 and with an opened warm-air flow path 16 by setting the flap 18 as per FIG. 2 into the ambient environment.

The share of the heating power ultimately used is consequently regulated via the share of the reheated mass air flow which is mixed with the cold mass air flow. The mass air flows are brought together and mixed in the area where flow path 14 and bypass 15 meet. The temperature of the mixed mass air flow, also designated as the mixing temperature, is detected by a temperature sensor in the mixed mass air flow and regulated via the pressure level of the refrigerant in the condenser 8. The mixed mass air flow is directed into the passenger compartment 9.

According to a second alternative, the condenser 8 is impinged on in the reheating mode by a mass air flow which is composed of two partial mass air flows with differing air temperature and/or differing absolute air humidity. The first area of the condenser 8 has the first partial mass air flow through it, while the second area of the condenser 8 has the second partial mass air flow through it. Upon overflowing the heat transmission surfaces, the partial mass air flows are not mixed, or only to a negligible degree. The power transferred from the condenser 8 is regulated via the partial mass air flow directed through the second area and the division of the surfaces of the areas of the condenser 8 by means of setting of the air guidance devices 27, 28, respectively. The partial mass air flow directed through the first area is diverted after flowing through the condenser 8 through the warm-air flow path 16 into the ambient environment. The temperature level of the mass air flow to be fed to the passenger compartment 9 through the second area of the condenser 8 is detected by a temperature sensor after the condenser 8 in the air flow direction, and regulated via the pressure level of the refrigerant in the condenser 8.

According to a third alternative, according to FIG. 2 or FIG. 3a and FIG. 3b, the heating power for reheating is regulated by means of the air guidance devices 27, 28, 27', 28' configured as flaps, as well as by means of the air guidance device 13, 24 configured as a flap. The heating power for reheating is consequently varied on the one hand via the size of the heat transmission surface and the division of the surfaces of the condenser 8 and on the other via the ratio of the partial mass air flows to be mixed; the cold mass air flow through the bypass channel 15; and reheated partial mass air flow through flow path 14. The heated partial mass air flow directed through the first area of the condenser 8 is directed when the warm-air flow path 16 is opened into the ambient environment by setting the flap 18.

FIG. 3*a* shows the centrally placed condenser 8 with the air guidance devices 27, 28 configured as movable flaps and the static air guidance devices 29, 30 from FIG. 2, configured as air guidance baffles, in an individual depiction. The bypass 15 is closed or opened as per FIG. 1 by means of the air guidance device 24.

The air conditioning system 1 can be run in a pure cooling-system mode, in a pure heating mode, in a mixed mode, or in a reheating mode. The blower 5, not depicted, feeds a mass air flow through the first flow channel 3, which flows completely via the vaporizer 7, thereby being cooled and demoisturized. The blower 6, not depicted, feeds a mass air flow through the second flow channel 4, which is directed via a partial area of the condenser 8, and again carries away the heat taken from the refrigerant in the vaporizer 7.

The air guidance devices 27, 28 are so aligned that a first area of the condenser 8 is situated in the second flow channel 4 and a second area of the condenser 8 is situated in the first flow channel 3. The air guidance device 24 is so aligned that the bypass 15 is closed and the entire mass air flow fed through the first flow channel 3 via the vaporizer 7 is directed through the second area of the condenser 8. The mass air flow of cooled and demoisturized air is again heated while flowing through the second area of the condenser 8.

A second mass air flow is fed parallel to the mass air flow in the first flow channel 3 via the first area of the condenser 8 in the second flow channel 4, and heated in the process. The mass air flow passing through the second flow channel 4 is diverted into the ambient environment.

The arrangement of the condenser 8 overlapping the flow channel as per FIG. 2 and FIG. 3*a* causes a controllable division of the heat transfer surface into two areas. The condenser 8 is able to be subdivided into areas from 0% to 100% of the entire heat transfer surface. At subdivisions of 0% and 100% respectively, the condenser 8 is situated entirely in one of the flow channels 3, 4. With a heat exchanger arrangement with a division deviating from 0% or 100% of the heat transfer surface, the areas are situated in share fashion within the flow channel 3 and within flow channel 4.

In FIG. 3*b*, the condenser 8 is depicted as arranged so that the heat transfer surface can be regulated to be divided in the area from 0% to about 30%. The larger partial area of the heat transfer surface at about 70% is not able to be regulated within flow channel 4. The governable division occurs by means of the air guidance device, comprising the air guidance devices 27', 28' and the air guidance baffles 29', 30'.

The condenser 8 is aligned in relation to the partition 10 so that the entire heat transmission surface is placed to one side of the partition 10. Thus the condenser 8 is situated completely within flow channel 4. The flow channels 3, 4 are separated from each other by the partition 10, by the air guidance devices 27', 28', and by static air guidance devices 29', 30'.

The shapes of the air guidance devices 27', 28', as well as the air guidance baffles 29', 30', are adjusted to each other similar to the configuration as per FIG. 2 and FIG. 3*a*, so that a mixing of the mass air flows in the flow channels 3, 4 is prevented. The air guidance baffles 29', 30' are in turn parallel to the partition 10. The ends of the overall arrangement of the air guidance baffles 29', 30' form two concave-shaped surfaces, each of which is equally bent about an axis 33', 34'. The center points of the circular arcs each correspond to the axes 33', 34' about which the concave-shaped surfaces are bent, and the rotational axes 33', 34' of the movable air guidance devices 27', 28'. The radii of the circular-arc-shaped surfaces are identical to the longitudinal extension of the air guidance devices 27', 28', i.e. the extension of the movable air guidance devices 27', 28' in the flow direction of the mass air flows through flow channels 3, 4.

The pivoting air guidance devices 27', 28' are aligned with the side edge facing away from the turning axis 33', 34' to the concave-curved surface of the ends of the air guidance baffle 29', 30'. For free mobility of the air guidance devices 27', 28', there remains a minimum-width gap between the surface and the side edge of the air guidance device 27', 28', which has no influence, or only a negligible one, on the flow of the mass air flow.

Thus, the air guidance devices of the embodiments as per FIG. 2 and FIG. 3*a* and FIG. 3*b*, respectively, are similar. The air guidance device as per FIG. 3*b* comprises only a small area of the cross-sectional surface of the condenser 8.

Reference is made to the specification for FIG. 2 to depict adjustment of the division of the mass air flows. With a twisting of the air guidance devices 27', 28' up to the greatest longitudinal extension of the air guidance baffles 29', 30', an area of about 30% of the heat transfer surface of the condenser 8 is situated within the first flow channel 3. With an alignment of the air guidance devices 27', 28' in the direction of the partition 10, the entire condenser 8 is situated within the second flow channel 4. The air guidance devices 27', 28' are similarly able to be adjusted continuously, without stages, in intermediate positions, as can be gleaned from FIG. 3*b*.

The bypass 15 within flow channel 3 is closed or opened by means of the air guidance device 24.

It is advantageous if the condenser 8 is configured for example as planar tubes, which are aligned with their flat side in the direction of the air guidance baffles 29, 29', 30, 30', and thus in the air flow direction. In addition, the number of air guidance baffles 29, 29', 30, 30' of a grid can advantageously correspond to the number of pipes of the condenser 8, with each pipe aligning flush with an air guidance baffle 29, 29', 30, 30' in the narrow side in the air flow direction. Also when the number of pipes of the condenser 8 and the air guidance baffles 29, 29', 30, 30' of a grid is different, an air guidance baffle 29, 29', 30, 30' and a tube with its narrow side should be aligned to be situated opposite.

The condenser 8 exhibits planar tubes with a width greater than 8 mm, with a width in the range from 11.5 mm to 18 mm preferred. According to an advantageous embodiment, the planar tubes are configured with a width of 12.3 mm or 16 mm.

With the heat exchanger arrangement having the second heat exchanger configured as a condenser 8, there exists a possibility, both in the cold-unit mode and in the heat-pump mode, to separate the air already treated upon overflowing the heat transfer surface of vaporizer 7 by means of modular partitions from the ambient air.

In FIG. 4, the air conditioning system 1 is depicted as per the embodiment in FIG. 1 as integrated with a closed and complete refrigerant circuit 60, integrated in air conditioning system 1. The refrigerant circuit is designed for R134a, R744, R1234yf, or other refrigerants.

The refrigerant circuit 60 comprises the vaporizer 7, a compressor 61, the condenser 8, a plenum 64, and an expansion device 67. The components of the refrigerant circuit 60 are connected by means of refrigerant lines 62, 63, 65, 66, 68, 69. The suction line 69 connects the vaporizer 7 with the compressor 61, while the delivery line 62 connects the compressor 61 with the condenser 8. Through the delivery line 63, the refrigerant flows from a first section of the condenser 8 to the plenum 64. The delivery lines 65 and 66 connect the plenum 64 with the inlet of a second section of the condenser 8 and the outlet of the second section of the condenser 8 with the expansion device 67. From the expansion device 67, the refrigerant flows through the refrigerant line 68 to the vaporizer 7.

The compressor 61 is preferably configured as an electrically powered compressor, but it can alternatively be one driven by an internal combustion engine of the vehicle. The expansion device 67 is advantageously configured as a regulable expansion device or expansion valve, but it can alternatively be configured as a thermostatic expansion valve.

Various configurations of the condenser 8 are derived from FIGS. 4, 5a and 5b.

In FIG. 4, the condenser 8 is configured as a component. The refrigerant flows through the refrigerant line 62 into the first section of the condenser 8 and after flowing out of the first section, is directed through the refrigerant line 63 to the plenum 64. After discharging from the plenum 64, the refrigerant flows through the refrigerant line 65 into the second section of the condenser 8, which is configured, for example, for supercooling of the refrigerant. Via the refrigerant line 66, the refrigerant flows to the expansion device 67.

In the embodiment form according to FIGS. 5a and 5b, the condenser 8 is composed of two independent components 8a, 8b. In the refrigerant flow direction, between components 8a, 8b, a refrigerant phase separation device is placed, which is configured as a plenum 64 with integrated liquid separation.

The refrigerant flows through the refrigerant line 62 into the first component 8a, which is provided for heat removal and condensation of the refrigerant, and after flowing out of the first component 8a is directed through the refrigerant line 63 to the plenum 64. After discharging from the plenum 64, the refrigerant passes through refrigerant line 65 into the second component 8b, which is configured for supercooling the refrigerant. Via the refrigerant line 66, the refrigerant flows to the expansion device 67.

With the aid of the plenum 64 configured as a refrigerant phase separation element with integrated liquid separation, the second component 8b, which is situated after the plenum 64 in the refrigerant flow direction, is impinged on only with liquid refrigerant. By separating out the gas phase, a possibility exists to configure the component 8b with a smaller volume and thus smaller required space. The requisite flow cross sections for the refrigerant are smaller than when a two-phase refrigerant flows through with a vapor component in the liquid phase.

The heat exchanger arrangements exhibit a condensation and heat removal surface configured as multiple rows as well as an additional supercooling surface. The components 8a for heat removal and condensation of the refrigerant are configured as two rows at minimum, but preferably four rows. The component 8b for supercooling of the refrigerant exhibits at least one row, but preferably two rows.

With the heat exchanger arrangement according to FIG. 5a, the components 8a, 8b of the condenser 8 are aligned in a row, one behind the other, in relation to the mass air flow, and have the mass air flow passing consecutively through. The mass air flow flows against the condensation and heat removal surface of component 8a and then is directed via the supercooling surface of component 8b.

With the heat exchanger arrangement according to FIG. 5b, the components 8a, 8b of the condenser 8 are aligned parallel next to each other. The components 8a with the heat removal and condensation surface could be situated within the second flow channel 4, while the component 8b is situated within the first flow channel 3. The components 8a, 8b and the condensation and heat-removal surface, respectively, as well as the supercooling surface are impinged on parallel by the mass air flows within the flow channels 3, 4. The mass air flow previously cooled and demoisturized that flows through flow channel 3 is again heated upon overflowing the supercooling surface of component 8b in the reheating mode of air conditioning system 1.

The component 8b can also be alternatively placed outside the housing 2 of air conditioning system 1 and is then impinged on by the aerodynamic force of vehicle motion.

From the foregoing description, one ordinarily skilled in the art can easily ascertain the essential characteristics of this invention and, without departing from the spirit and scope thereof, can make various changes and modifications to the invention to adapt it to various usages and conditions.

LIST OF REFERENCE SYMBOLS 1 air conditioning system
2 housing
3 first flow channel
4 second flow channel
5, 6 blower
7 heat exchanger, vaporizer
8 heat exchanger, condenser
8a, 8b components of condenser 8
9 passenger compartment
10 partition
11, 12 cold-air flow path
13 air guidance device or flap of cold-air flow paths 11, 12
14 flow path in first flow channel 3
15 bypass channel in first flow channel 3
16, 17 warm-air flow path
18 air guidance device or flap of warm-air flow paths 16, 17
19 air guidance device for inlet to flow path 14
22 air guidance device for outlet from flow path 14
23 air guidance device or flap of cold air for cold-air flow path 11
24 air guidance device or flap for bypass channel 15
25, 26 air guidance device or flap of warm air flow path 16, 17
27, 27' air guidance device or flap between first and second flow channel 3,4 when flowing toward condenser 8
28, 28' air guidance device or flap between first and second flow channel 3,4 when flowing away from condenser 8
29, 29' static air guidance device or air guidance baffle
30, 30' static air guidance device or air guidance baffle
31, 32 surface of the static air guidance device 29, 30
33, 34 axis, turning axis of air guidance device 27, 28
35, 36 turning direction of air guidance device 27, 28
60 refrigerant circuit
61 compressor
62, 63 refrigerant line, delivery line
64 plenum
65, 66, 68 refrigerant line, delivery line
67 expansion device
69 refrigerant line, suction line
L length

What is claimed is:

1. An air conditioning system for treating air of a passenger compartment of a motor vehicle, the air conditioning system configured to be operable in a cooling-system mode, a heat-pump mode, and a reheating mode, the air conditioning system comprising:

a housing including a first flow channel and a second flow channel for directing air; and a refrigerant circuit comprising a first heat exchanger operable as a vaporizer, a compressor, a second heat exchanger operable as a condenser, and an expansion device; wherein the second heat exchanger is formed from two segregated components, a first component having a condensation and heat removal surface and a second component having a super-cooling surface, wherein a refrigerant phase separation element is disposed within the refrigerant circuit between the first component and the second component of the second heat exchanger; wherein a refrigerant flows through the second heat exchanger in the refrigerant circuit and air flowing through at least one of the first flow channel and the second flow channel impinges on the second heat exchanger to transfer heat from the refrigerant to the air; wherein the first heat exchanger is disposed within the first flow channel and the second heat exchanger is disposed in at least a portion of each of the first flow channel and the second flow channel.

2. The air conditioning system according to claim 1, wherein the first flow channel is divided downstream of the first heat changer in a direction of air flow into a first flow path and a bypass flow path, a portion of the second heat exchanger spanning the first flow path.

3. The air conditioning system according to claim 2, wherein the portion of the second heat exchanger spanning the first flow path is the second component of the second heat exchanger having the super-cooling surface.

4. The air conditioning system according to claim 1, wherein the first component and second component of the second heat exchanger are each disposed in both the first flow channel and the second flow channel, the second component disposed downstream of the first component in a direction of air flow.

5. The air conditioning system according to claim 1, wherein the first flow channel is segregated from the second flow channel by both a partition and an air guidance device in the form of a pivoting flap disposed adjacent an entrance to the second heat exchanger.

6. The air conditioning system according to claim 5, wherein a first end of the air guidance device is aligned with the partition and the air guidance device is rotatable about the first end of the air guidance device to cause a second end of the air guidance device to follow a circular-arc path.

7. The air conditioning system according to claim 6, further including an air guidance baffle disposed between the air guidance device and the second heat exchanger, wherein a surface of the air guidance baffle has a shape corresponding to the circular-arc path followed by the second end of the air guidance device.

8. The air conditioning system according to claim 7, wherein a rotational orientation of the air guidance device alters a size of a first area of a heat exchanging surface of the second heat exchanger impinged by air originating from the first flow channel and a size of a second area of the heat exchanging surface of the second heat exchanger impinged by air originating from the second flow channel.

9. A method of operating an air conditioning system for a combined cold-unit and heat-pump operation mode for cooling and heating, as well as a reheating operation mode for treating air of a passenger compartment of a motor vehicle, the method of operating the air conditioning system in the reheating operation mode comprising the steps of:

directing a first partial mass air flow and a second partial mass air flow into the air conditioning system in a direction of air flow;

dividing the second partial mass air flow into a cold mass air flow and a reheating air mass flow after the second partial mass air flow has flowed over a vaporizer;

heating the first partial mass air flow upon the first partial mass air flow impinging a first area of a heat transfer surface of a condenser;

heating the reheating air mass flow upon the reheating air mass flow impinging a second area of the heat transfer surface of the condenser; and directing the first partial mass air flow into the ambient environment.

10. The method according to claim 9, wherein each of the first partial mass air flow and the reheating air mass flow are heated to a temperature above a condensation temperature of a refrigerant flowing through the condenser.

11. The method according to claim 9, further comprising the step of regulating a heating power of the condenser by changing an orientation of at least one air guidance device disposed upstream of the condenser in the direction of air flow.

12. The method according to claim 11, wherein the changing of the orientation of the at least one air guidance device changes a size of each of the first area and the second area of the heat transfer surface of the condenser.

13. The method according to claim 12, further comprising the steps of:

regulating the temperature of the reheating air mass flow impinging the second area of the heat transfer surface of the condenser using a pressure level of a refrigerant flowing through the condenser;

detecting a temperature of the reheating air mass flow using a temperature sensor disposed downstream of the condenser in the direction of air flow; and directing the reheating air mass flow into the passenger compartment.

14. The method according to claim 9, further comprising the steps of:

mixing the reheating air mass flow with the cold mass air flow after the reheating air mass flow has been heated by impinging the second area of the heat transfer surface of the condenser to form a mixed mass air flow;

regulating a temperature of the mixed mass air flow using a pressure level of a refrigerant flowing through the condenser;

detecting the temperature of the mixed mass air flow using a temperature sensor disposed downstream of the condenser in the direction of flow of the air; and directing the mixed mass air flow into the passenger compartment.

\* \* \* \* \*